(12) United States Patent
Cho et al.

(10) Patent No.: US 9,372,325 B2
(45) Date of Patent: Jun. 21, 2016

(54) PHOTOGRAPHIC LENS OPTICAL SYSTEM

(71) Applicant: KOLEN CO., LTD., Seongnam-si (KR)

(72) Inventors: Jae Hoon Cho, Seongnam-si (KR); Chi Ho Ahn, Seongnam-si (KR); Ji Eun Kim, Seongnam-si (KR); Se Jin Kim, Seoul (KR); Seong Hee Bae, Daejeon (KR)

(73) Assignee: KOLEN CO., LTD, Seongnam-si (KR)

(*) Notice: Subject to any disclaimer, the term of this patent is extended or adjusted under 35 U.S.C. 154(b) by 0 days.

(21) Appl. No.: 14/570,694

(22) Filed: Dec. 15, 2014

(65) Prior Publication Data

US 2015/0177491 A1    Jun. 25, 2015

(30) Foreign Application Priority Data

Dec. 19, 2013 (KR) .......................... 10-2013-0159436

(51) Int. Cl.
*G02B 13/18* (2006.01)
*G02B 13/00* (2006.01)
*G02B 9/60* (2006.01)
*G02B 13/04* (2006.01)

(52) U.S. Cl.
CPC .............. *G02B 13/0045* (2013.01); *G02B 9/60* (2013.01); *G02B 13/04* (2013.01)

(58) Field of Classification Search
CPC .................................................. G02B 13/0045
USPC .................. 359/756, 761, 713, 763, 770, 714
See application file for complete search history.

(56) References Cited

U.S. PATENT DOCUMENTS

| 4,764,001 A * | 8/1988 | Yokota ................. G02B 23/243 359/740 |
| 2005/0013469 A1 | 1/2005 | Yang |
| 2005/0181774 A1 | 8/2005 | Miyata |
| 2012/0050884 A1 | 3/2012 | Kurashige et al. |
| 2012/0206822 A1* | 8/2012 | Hsieh ..................... G02B 13/06 359/753 |
| 2014/0029115 A1* | 1/2014 | Liao ....................... G02B 13/06 359/713 |

FOREIGN PATENT DOCUMENTS

| JP | 2004341376 A | 12/2004 |
| JP | 2005128194 A | 5/2005 |
| JP | 2005181774 A | 7/2005 |
| JP | 2012103675 A | 5/2012 |

* cited by examiner

*Primary Examiner* — Scott J Sugarman
(74) *Attorney, Agent, or Firm* — St. Onge Steward Johnston & Reens, LLC (57) ABSTRACT

A photographic lens optical system. The photographic lens optical system includes a first lens, a second lens, a third lens, a fourth lens, a fifth lens, and a sixth lens that are sequentially arranged in a direction from an object toward an image sensor. The first lens has a negative (−) power, and the emission surface thereof may be convex toward the object. The second lens may have a positive (+) power, the third and fourth lenses have positive (+) powers, and the fifth lens has a negative (−) power. Furthermore, the sixth lens is an aspherical lens having a positive (+) power.

5 Claims, 8 Drawing Sheets

PHOTOGRAPHIC LENS OPTICAL SYSTEM

FIELD OF THE INVENTION

One or more embodiments of the present invention relate to optical devices, and more particularly, to a photographic lens optical system applied to photographing apparatuses.

BACKGROUND OF THE INVENTION

Semiconductor image sensors developed and enhanced in various forms significantly widen the fields of application of photographing apparatuses such as cameras.

The most popular semiconductor image sensors include charge-coupled device (CCD)-type image sensors and complementary metal oxide semiconductor (CMOS)-type image sensors. Recently, along with the significantly improved performance of CMOS devices, CMOS-type image sensors have been applied to a wide range of fields. Pixel integration of such semiconductor image sensors is rapidly increasing through repeated innovations, and thus even small semiconductor image sensors are now capable of picking up very high resolution images.

In correspondence to such high-pixel image sensors, high-quality lens optical systems suitable for the image sensors are demanded. It is necessary for a high-quality lens optical system to exhibit low aberration and high sharpness at all regions.

To obtain a fine quality image, not only a high-quality image sensor as described above, but also a lens optical system suitable for the high-quality image sensor is needed.

It is necessary to maintain a high performance and reduce the size of lens optical systems applied to general small cameras, e.g., lens optical systems applied to small cameras for mobile phones or vehicle cameras. A general lens optical system has a structure in which a plurality of lenses are arranged on a single optical axis, where the lenses include one or more glass lenses for securing a fine optical performance. Particularly, from 5 to 6 glass lenses are applied to a vehicle camera. However, a glass lens is expensive to manufacture and size reduction of a lens optical system is limited due to limits in forming/manufacturing glass lenses.

Thus, there is still a demand for a lens for a small camera, which has a higher optical performance than demanded by an optical design thereof, may be easily downsized due to ease of formation/manufacture at a reduced cost.

SUMMARY OF THE INVENTION

One or more embodiments of the present invention include a high-performance lens optical system that may be easily miniaturized.

One or more embodiments of the present invention include a high-performance lens optical system that may be manufactured at a reduced cost.

Additional aspects will be set forth in part in the description which follows and, in part, will be apparent from the description, or may be learned by practice of the presented embodiments.

According to one or more embodiments of the present invention, a lens optical system includes a lens optics including a first lens, a second lens, a third lens, a fourth lens, a fifth lens, and a sixth lens, each of which includes an incidence surface facing an object and an emission surface facing an image plane, arranged on the optical axis between the object and the image plane, wherein the first lens is a meniscus-type lens having a negative (−) power and convex toward the object, the second lens is a meniscus lens having a positive (+) power and concave away from the object, the third lens is a double-convex lens having a positive (+) power, the fourth lens is a lens having a positive (+) power and having the emission surface that is convex toward the image plane, the fifth lens is a lens having a negative (−) power and having the incident surface concave away from the image plane, and the sixth lens is a lens having a positive (+) power, has at least one aspherical surface, and is convex toward the image plane.

A refraction index Nd6 of the sixth lens satisfies any of the following Inequalities 1 through 3:

$$1.5 < Nd6 < 1.65, \qquad \text{<Inequality 1>}$$

wherein Nd6 denotes refraction index of the sixth lens.

$$0.7 < \tan(\theta)/YA1 < 1.4, \qquad \text{<Inequality 2>}$$

θ denotes the total viewing angle of the lens optics, and the YA1 denotes Y semi-aperture of the emission surface of the first lens.

The fourth lens and the fifth lens may be attached to each other.

The lens optical system may further include a stop arranged between the second lens and the third lens.

The lens optical system may further include an infrared ray screening unit between the object and the image plane.

The infrared ray screening unit may be arranged between the sixth lens and the image plane.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

FIGS. 1 through 5 show lens optical systems according to first through fifth embodiments of the present invention.

As shown in FIGS. 1 through 5, each of the lens optical systems according to embodiments of the present invention includes six lenses, which are sequentially between an object OBJ and an image sensor IMG having an image forming surface (or image plane) on which an image of the object OBJ is formed. Each of the six lenses includes an incidence surface to which light is incident (that is, an incidence surface) and an emission surface from which a light is emitted (that is, facing the image sensor IMG), where the lenses include a first lens I, a second lens II, a third lens III, a fourth lens IV, a fifth lens V, and a sixth lens VI in the present embodiment. The first lens I has a negative (−) power (refraction index) and may have a meniscus shape that is convex toward the object OBJ.

The second lens II has a positive (+) power and a meniscus shape that is concave away from the object OBJ.

The third lens III is a double-convex lens having a positive (+) power.

The fourth lens IV has a negative (−) power, where the emission surface thereof is convex toward the image sensor IMG. The fifth lens V has a negative (−) power and has a concave incidence surface. Here the curvature R of the emission surface of the fourth lens IV may be identical to that of the emission surface of the fifth lens V, where the fourth lens IV and the fifth lens V may be a constant interval or distance T, e.g., about 0.003 mm, apart from each other according to an embodiment of the present invention or may closely contact each other (T=0.0000) and attached according to another embodiment of the present invention. For example, the fourth lens IV and the fifth lens V may be attached to each other (T=0.0000) and constitute an attached lens having a negative (−) power in the first through fourth embodiments of the present invention, whereas the fourth lens IV and the fifth lens V may be 0.003 mm apart from each other in the fifth embodiment of the present invention.

The sixth lens VI has a positive (+) power, where at least one of the incidence surface and the emission surface thereof is aspherical and the emission surface is convex toward the image sensor IMG.

A stop S1 and an infrared ray screening unit IR may further be arranged. The stop S1 may be arranged between the second lens II and the third lens III. The infrared ray screening unit IR may be arranged between the sixth lens VI and the image sensor IMG. The infrared ray screening unit IR may be an infrared ray screening filter. Locations of the stop S1 and the infrared ray screening unit IR may vary. Lens optical systems according to embodiments of the present invention having the above-stated configuration may satisfy at least one of Inequality 1 and Inequality 2 below.

$$1.5 < Nd6 < 1.65 \qquad \text{<Inequality 1>}$$

Here, Nd6 denotes the refraction index of the sixth lens VI. Inequality 1 shows a condition for reducing the size and weight of a lens optical system.

$$0.7 < \tan(\theta)/YA1 < 1.4 \qquad \text{<Inequality 2>}$$

Here, θ denotes the total viewing angle of a lens optical system, and YA1 denotes Y semi-aperture of the emission surface of the first lens I.

Inequality 2 shows a condition for determining the structure of a lens optical system. If the solution of Inequality 2 exceeds the upper limit, a viewing angle of a lens optical system increases, but spherical aberration and comma aberration increase. If the solution of Inequality 2 is below the lower limit, spherical aberration and comman aberration of a lens optical system decrease, but the viewing angle thereof also decreases. Furthermore, chromatic aberration may be reduced by arranging the fifth lens V and the sixth lens VI, which are low-refraction lenses, close, and aberration may be corrected by forming at least one of the surfaces of the sixth lens VI as an aspheric surface.

In the first through fifth embodiments of the present invention as described above, values of Inequality 1 and Inequality 2 are as shown in Table 1 below. In Table 1, the unit of the viewing angle θ is degrees)(°.

TABLE 1

|  | Nd6 | Inequality 1 | θ | tan(θ) | YA1 | Inequality 2 |
|---|---|---|---|---|---|---|
| Embodiment 1 | 1.534 | 1.534 | 64.03 | 2.56 | 3.28 | 0.78 |
| Embodiment 2 | 1.534 | 1.534 | 64.22 | 5.41 | 4.04 | 1.34 |
| Embodiment 3 | 1.534 | 1.534 | 64.13 | 3.58 | 3.89 | 0.92 |
| Embodiment 4 | 1.534 | 1.534 | 64.09 | 3.09 | 4.04 | 0.76 |
| Embodiment 5 | 1.534 | 1.534 | 64.25 | 6.50 | 4.84 | 1.34 |

Referring to Table 1, the lens optical systems according to the first through fifth embodiments of the present invention satisfy Inequality 1 and Inequality 2. In the lens optical systems according to embodiments of the present invention having such configurations, the first through sixth lenses I through VI may be formed of a plastic material in consideration of shapes and dimensions. In other words, all of the first through sixth lenses I through VI may be plastic lenses. If the first through sixth lenses I through VI are a glass lens, manufacturing cost is high and it is difficult to miniaturize a lens optical system due to limits in formation/manufacture. However, according to the present invention, all of the first through sixth lenses I through VI may be formed of a plastic material, and thus, various advantages may be obtained. However, materials for forming the first through sixth lenses I through VI according to the present invention are not limited to plastic materials. If necessary, at least one of the first through sixth lenses I through VI may be formed of glass.

Hereinafter, the first through fifth embodiments of the present invention will be described in detail with respect to lens data and the attached drawings.

Tables 2 through 6 below show curvature radiuses, lens thicknesses or distances between lenses, refraction indexes, and Abbe's numbers of the respective lenses constituting the lens optical systems as shown in FIGS. 1 through 5, respectively.

In Tables 2 through 6, R denotes a curvature radius, D denotes a lens thickness, a distance between lenses, or a distance between components adjacent to each other, Nd denotes a refraction index of a lens measured by using d-line, and Vd denotes an Abbe's number of a lens regarding d-line. A lens surface number with * indicates that a lens surface corresponding to the surface number is aspherical. The unit for the curvature radius R and the lens thickness D is mm.

TABLE 2

| Embodiment 1 | | Surface | R | D | Nd | Vd |
|---|---|---|---|---|---|---|
| | Object | | Infinity | Infinity | | |
| | 1 | | Infinity | 0.0000 | | |
| I | | 2 | 8.6263 | 1.1756 | 1.6998 | 55.4589 |
| | | 3 | 3.0587 | 3.1416 | | |
| II | | 4 | −6.6999 | 4.0484 | 1.8396 | 42.9836 |
| | | 5 | −7.7030 | 0.1079 | | |
| | 6 | | Infinity | 0.2635 | | |
| | Stop | | Infinity | 0.4788 | | |
| III | | 8 | 6.4608 | 3.2898 | 1.6998 | 55.4589 |
| | | 9 | −12.2607 | 0.100 | | |
| IV | | 10 | 8.1443 | 2.4356 | 1.5056 | 66.8862 |
| | | 11 | −3.5488 | 0.0000 | | |
| V | | 12 | −3.5488 | 0.7186 | 1.7572 | 27.6861 |
| | | 13 | 5.8771 | 0.9248 | | |
| VI | | 14* | −60.8218 | 5.3652 | 1.5340 | 55.8559 |
| | | 15* | −3.5468 | 1.0000 | | |
| | 16 | | Infinity | 1.0000 | | |
| | 17 | | Infinity | 0.8000 | | |
| | 18 | | Infinity | 0.1483 | | |
| | Image | | Infinity | 0.0018 | | |

TABLE 3

| Embodiment 2 | | Surface | R | T | Nd | Vd |
|---|---|---|---|---|---|---|
| | Object | | Infinity | Infinity | | |
| | 1 | | Infinity | 0.0000 | | |
| I | | 2 | 12.7835 | 2.000 | 1.8018 | 45.3962 |
| | | 3 | 3.8553 | 4.6152 | | |
| II | | 4 | −7.7926 | 4.8224 | 1.8396 | 42.9835 |
| | | 5 | −8.4667 | 0.6172 | | |
| | 6 | | Infinity | 0.6173 | | |
| | Stop | | Infinity | 0.1000 | | |
| III | | 8 | 6.2595 | 4.1171 | 1.6763 | 54.3554 |
| | | 9 | −24.6934 | 0.1695 | | |
| IV | | 10 | 9.1723 | 2.6591 | 1.5013 | 80.8481 |
| | | 11 | −3.8270 | 0.0000 | | |
| V | | 12 | −3.8270 | 0.6000 | 1.7717 | 25.4593 |
| | | 13 | 9.4375 | 0.8761 | | |
| VI | | 14* | −16.8902 | 5.9062 | 1.5340 | 55.8559 |
| | | 15* | −3.7190 | 1.0000 | | |
| | 16 | | Infinity | 1.0000 | | |
| | 17 | | Infinity | 0.8000 | | |
| | 18 | | Infinity | 0.0988 | | |
| | Image | | Infinity | 0.0012 | | |

TABLE 4

| Embodiment 3 | | Surface | R | T | Nd | Vd |
|---|---|---|---|---|---|---|
| | Object | | Infinity | Infinity | | |
| | 1 | | Infinity | 0.0000 | | |
| I | | 2 | 9.7361 | 2.1000 | 1.7460 | 50.0601 |
| | | 3 | 3.1977 | 3.5202 | | |
| II | | 4 | −6.6390 | 4.1064 | 1.8396 | 42.9835 |
| | | 5 | −7.6540 | 0.1000 | | |
| | 6 | | Infinity | 0.1000 | | |
| | Stop | | Infinity | 0.1000 | | |
| III | | 8 | 6.3254 | 3.8316 | 1.6985 | 55.5395 |
| | | 9 | −14.0808 | 0.1000 | | |
| IV | | 10 | 7.5693 | 2.3755 | 1.5083 | 79.0886 |
| | | 11 | −3.6311 | 0.0000 | | |
| V | | 12 | −3.6311 | 0.5731 | 1.7496 | 27.6356 |
| | | 13 | 5.9254 | 0.9613 | | |

TABLE 4-continued

| Embodiment 3 | | Surface | R | T | Nd | Vd |
|---|---|---|---|---|---|---|
| VI | | 14* | −37.9016 | 5.2018 | 1.5340 | 55.8559 |
| | | 15* | −3.4996 | 1.0000 | | |
| | 16 | | Infinity | 1.0000 | | |
| | 17 | | Infinity | 0.8000 | | |
| | 18 | | Infinity | 0.0975 | | |
| | Image | | Infinity | 0.0026 | | |

TABLE 5

| Embodiment 4 | | Surface | R | T | Nd | Vd |
|---|---|---|---|---|---|---|
| | Object | | Infinity | Infinity | | |
| | 1 | | Infinity | 0.0000 | | |
| I | | 2 | 10.7517 | 2.1000 | 1.7366 | 51.0182 |
| | | 3 | 3.4699 | 4.0510 | | |
| II | | 4 | −6.6311 | 4.0188 | 1.8384 | 43.0549 |
| | | 5 | −7.7089 | 0.1000 | | |
| | 6 | | Infinity | 0.1000 | | |
| | Stop | | Infinity | 0.1000 | | |
| III | | 8 | 6.2584 | 3.9511 | 1.6924 | 55.9323 |
| | | 9 | −17.5296 | 0.1000 | | |
| IV | | 10 | 6.5014 | 2.3227 | 1.5006 | 81.0427 |
| | | 11 | −4.1748 | 0.0000 | | |
| V | | 12 | −4.1748 | 0.5000 | 1.7522 | 26.6205 |
| | | 13 | 5.8433 | 1.1061 | | |
| VI | | 14* | −19.7878 | 4.9415 | 1.5340 | 55.8559 |
| | | 15* | −3.4307 | 1.0000 | | |
| | 16 | | Infinity | 1.0000 | | |
| | 17 | | Infinity | 0.8000 | | |
| | 18 | | Infinity | 0.0967 | | |
| | Image | | Infinity | 0.0033 | | |

TABLE 6

| Embodiment 5 | | Surface | R | T | Nd | Vd |
|---|---|---|---|---|---|---|
| | Object | | Infinity | Infinity | | |
| | 1 | | Infinity | 0.0000 | | |
| I | | 2 | 12.8434 | 3.5000 | 1.7359 | 50.7374 |
| | | 3 | 3.6165 | 4.5158 | | |
| II | | 4 | −6.4697 | 4.0676 | 1.8192 | 43.9431 |
| | | 5 | −7.4984 | 0.1000 | | |
| | 6 | | Infinity | 0.1000 | | |
| | Stop | | Infinity | 0.1000 | | |
| III | | 8 | 6.1711 | 4.1718 | 1.6836 | 56.3232 |
| | | 9 | −21.9250 | 0.1000 | | |
| IV | | 10 | 6.2436 | 2.1741 | 1.5071 | 79.0155 |
| | | 11 | −4.4243 | 0.003 | | |
| V | | 12 | −4.4243 | 0.7000 | 1.7432 | 26.4284 |
| | | 13 | 5.8776 | 0.9969 | | |
| VI | | 14* | −24.7652 | 5.3077 | 1.5340 | 55.8559 |
| | | 15* | −3.4527 | 0.5000 | | |
| | 16 | | Infinity | 0.8000 | | |
| | 17 | | Infinity | 1.0912 | | |
| | Image | | Infinity | −0.0250 | | |

Aspherical surfaces of the lens optical systems according to the first through fifth embodiments of the present invention satisfy the conventional aspherical surface equation of Equation 3 below.

$$x = \frac{c' y^3}{1 + \sqrt{1 - (K+1)c'^2 y^2}} + Ay^4 + By^6 + Cy^8 + Dy^{10} + Ey^{12} \quad \text{(Equation 3)}$$

Here, x denotes a distance (depth) from the vertex of a lens in the optical axis direction, y denotes a distance (height) in a direction perpendicular to the optical axis, c' denotes a paraxial curvature (the reciprocal number, 1/r) of a curvature radius at the vertex of the lens, K denotes the conic constant of aspheric face, and A, B, C, D, and E denote high-order aspheric coefficients.

Tables 7 through 11 below show aspheric coefficients in the lens optical systems according to the first through fifth embodiments of the present invention corresponding to FIGS. 1 through 5, respectively. In other words, Tables 7 through 11 show aspheric coefficients of the incident surface 14* and the emission surface 15* of the sixth lens VI as shown in FIGS. 2 through 6, respectively.

TABLE 7

| Surface | K | A | B | C | D | E |
|---|---|---|---|---|---|---|
| 14* | −527.6471 | −0.0048 | −0.0004 | 0.0002 | −0.0000 | 0.0000 |
| 15* | −1.2823 | 0.0012 | −0.0002 | 0.0000 | −0.0000 | 0.0000 |

TABLE 8

| Surface | K | A | B | C | D | E |
|---|---|---|---|---|---|---|
| 14* | 43.2902 | −0.0032 | −0.0001 | 0.0001 | −0.0000 | 0.0000 |
| 15* | −1.5270 | 0.0015 | −0.0003 | 0.0000 | −0.0000 | 0.0000 |

TABLE 9

| Surface | K | A | B | C | D | E |
|---|---|---|---|---|---|---|
| 14* | 55.9501 | −0.0051 | −0.0005 | 0.0001 | −0.0000 | 0.0000 |
| 15* | −1.2004 | 0.0011 | −0.0002 | 0.0000 | −0.0000 | 0.0000 |

TABLE 10

| Surface | K | A | B | C | D | E |
|---|---|---|---|---|---|---|
| 14* | 46.7225 | −0.0056 | −0.0005 | 0.0001 | −0.0000 | 0.0000 |
| 15* | −1.1292 | 0.0009 | −0.0003 | 0.0000 | −0.0000 | 0.0000 |

TABLE 11

| S | K | A | B | C | D | E |
|---|---|---|---|---|---|---|
| 14* | 81.6107 | −0.0056 | −0.0004 | 0.001 | −0.0000 | 0.0000 |
| 15* | −1.4165 | 0.0013 | −0.0003 | 0.0000 | −0.0000 | 0.0000 |

Figure 1:
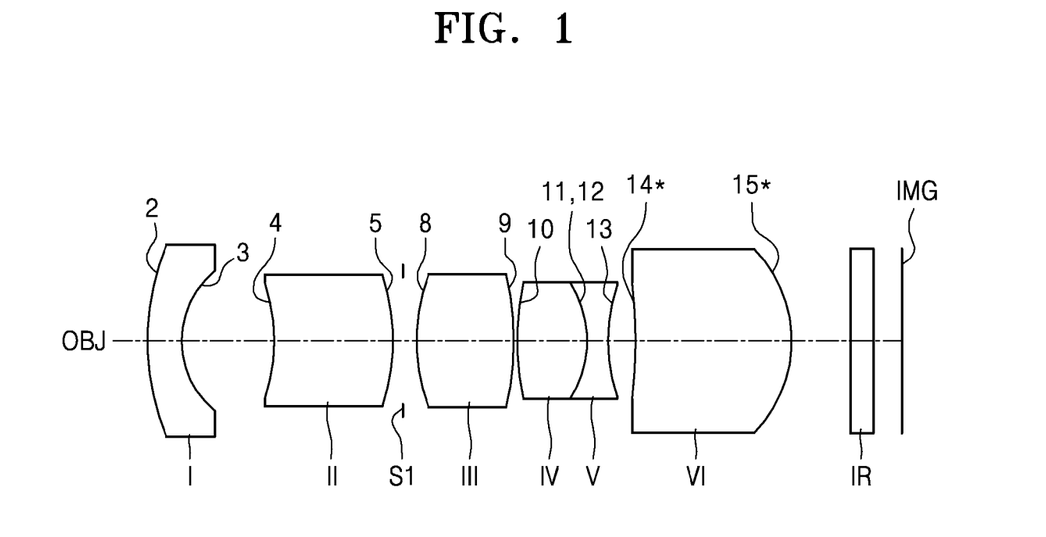
FIG. 1 is a sectional view showing an arrangement of major components of a lens optical system according to a first embodiment of the present invention.
Figure 2:
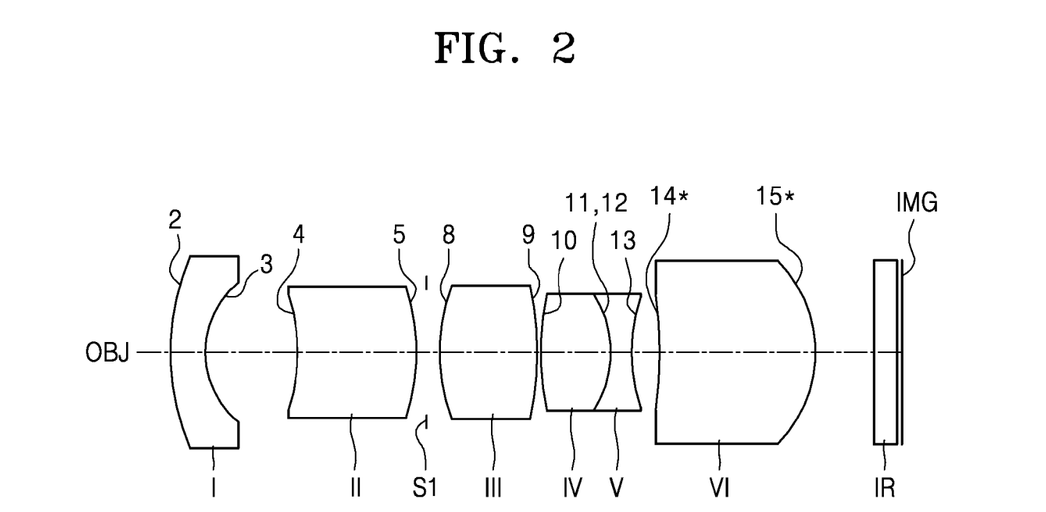
FIG. 2 is a sectional view showing an arrangement of major components of a lens optical system according to a second embodiment of the present invention.
Figure 3:
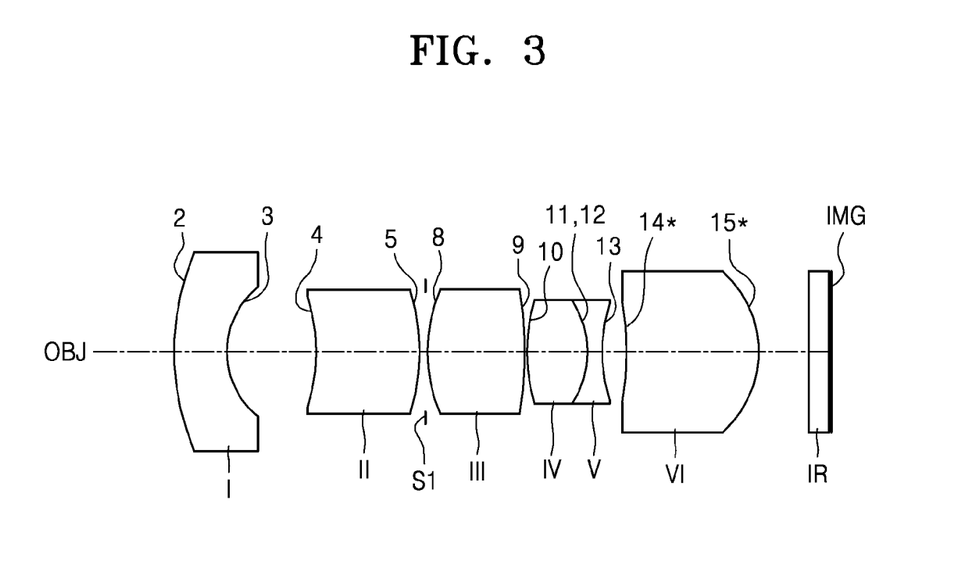
FIG. 3 is a sectional view showing an arrangement of major components of a lens optical system according to a third embodiment of the present invention.
Figure 4:
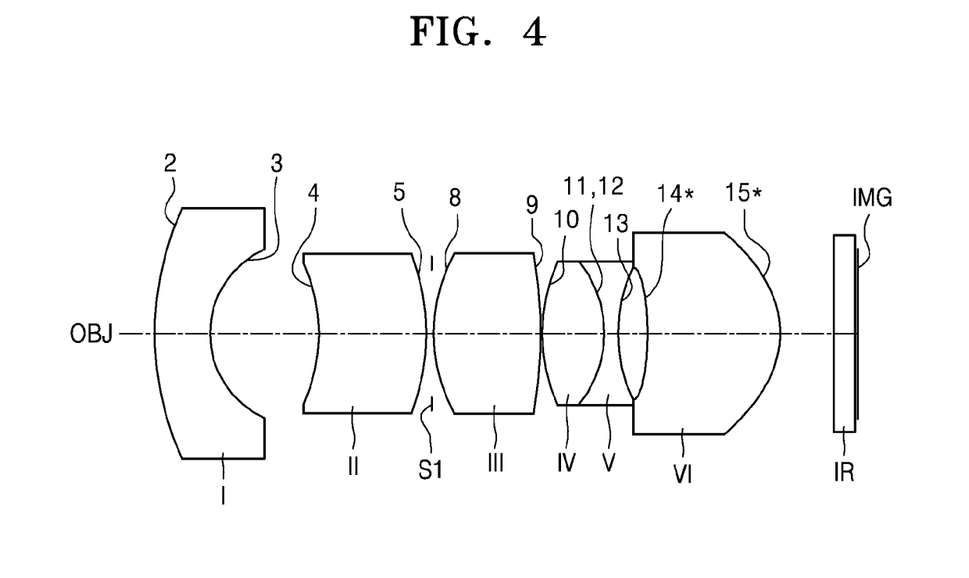
FIG. 4 is a sectional view showing an arrangement of major components of a lens optical system according to a fourth embodiment of the present invention.
Figure 5:
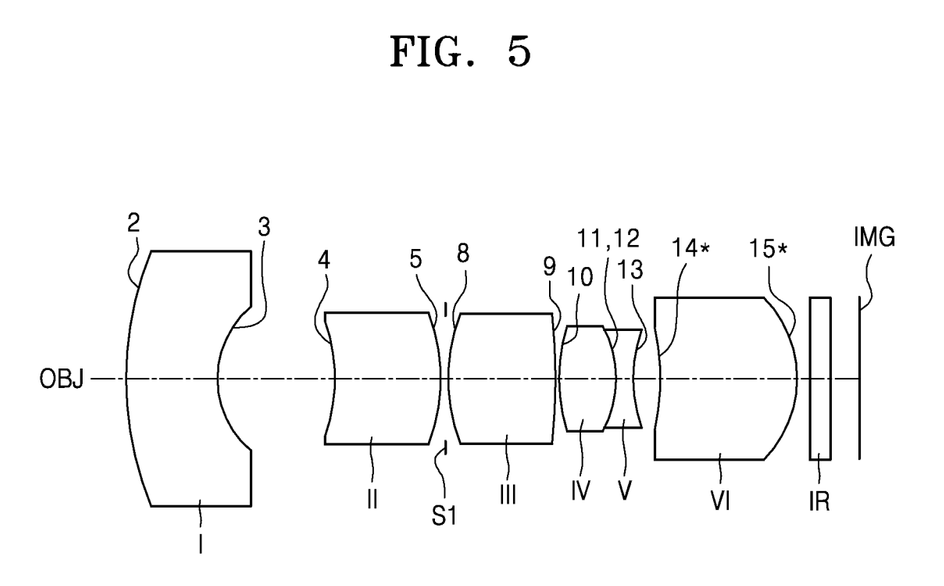
FIG. 5 is a sectional view showing an arrangement of major components of a lens optical system according to a fifth embodiment of the present invention.
Figure 6:
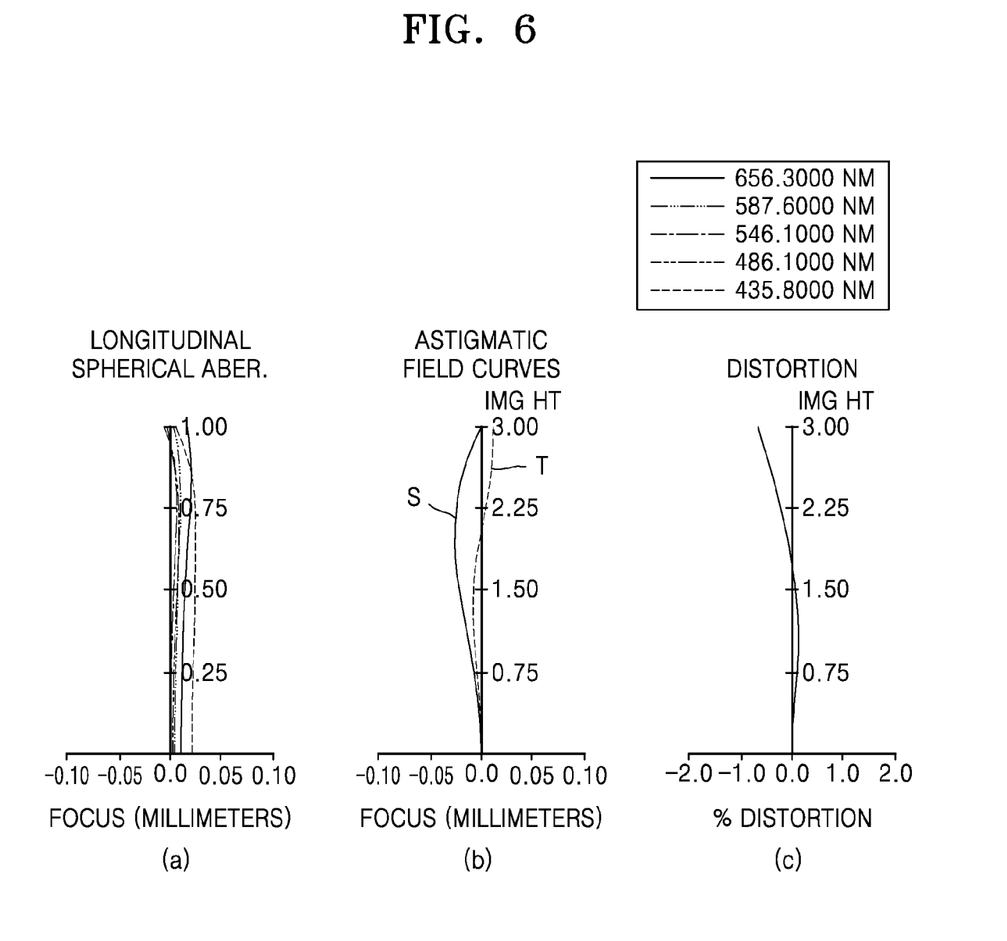
FIG. 6 is an aberration diagram showing longitudinal spherical aberration, astigmatic field curvature, and distortion of a lens optical system according to the first embodiment of the present invention.

FIG. 6 is an aberration diagram showing longitudinal spherical aberration, astigmatic field curvature, and distortion of a lens optical system according to the first embodiment of the present invention (FIG. 1), that is, a lens optical system having the specification shown in Table 2.

FIG. 6 (a) indicates spherical aberrations of the lens optical system with respect to lights of various wavelengths and FIG. 6 (b) indicates the astigmatic field curvature of the lens optical system, that is, the tangential field curvature T and the sagittal field curvature S.

Here, wavelengths of lights used for obtaining the data shown in FIG. 6 (a) were 656.3000 nm, 587.6000 nm, 546.1000 nm, 486.1000 nm, and 435.8000 nm. The wavelength of lights used for obtaining the data shown in FIGS. 6 (b) and (c) was 546.1000 nm. The same description above applies to FIGS. 7 through 10.

Figure 7:
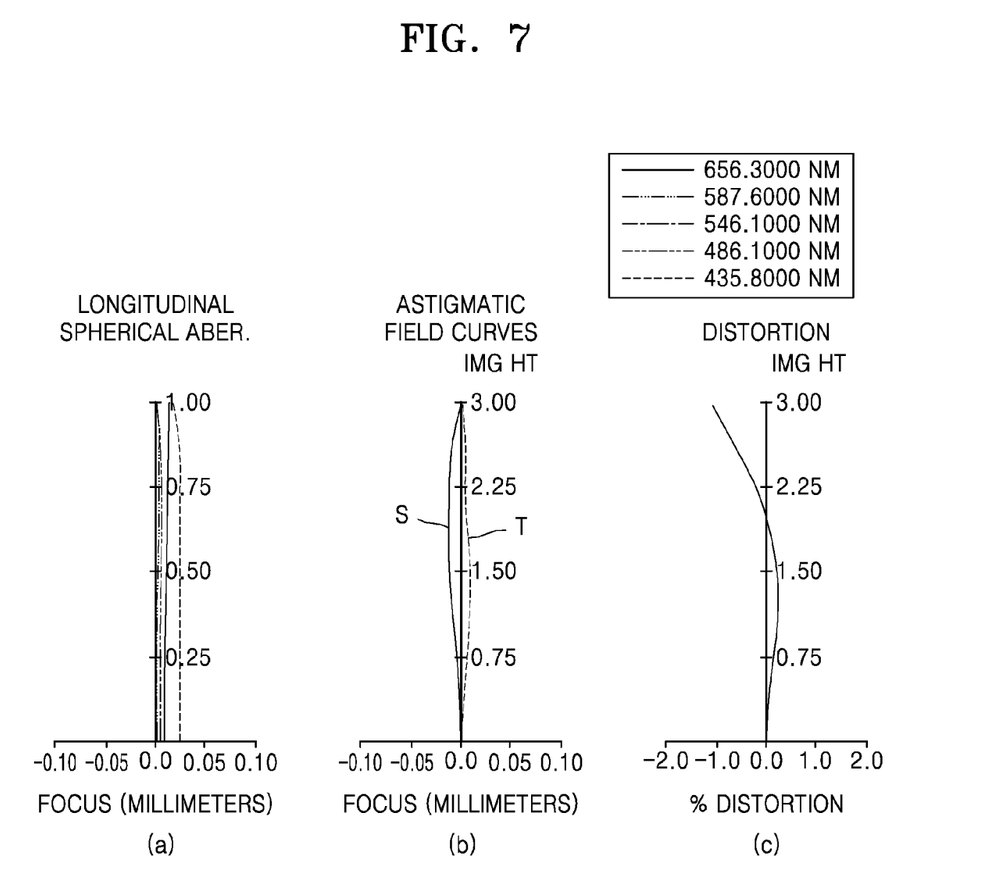
FIG. 7 is an aberration diagram showing longitudinal spherical aberration, astigmatic field curvature, and distortion of a lens optical system according to the second embodiment of the present invention.

FIGS. 7 (a), (b), and (c) show longitudinal spherical aberration, astigmatic field curvature, and distortion of a lens optical system according to the second embodiment of the present invention (FIG. 2), that is, a lens optical system having the specification as shown in Table 3.

Figure 8:
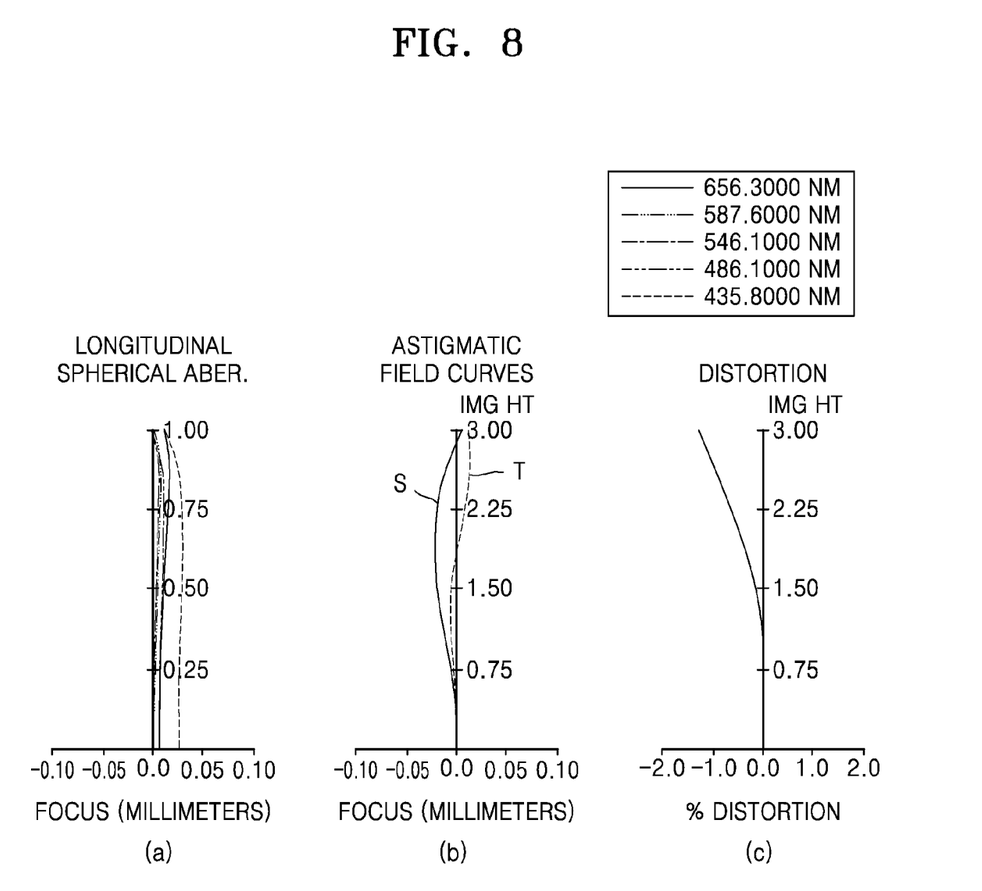
FIG. 8 is an aberration diagram showing longitudinal spherical aberration, astigmatic field curvature, and distortion of a lens optical system according to the third embodiment of the present invention.

FIGS. 8 (a), (b), and (c) show longitudinal spherical aberration, astigmatic field curvature, and distortion of a lens optical system according to the third embodiment of the present invention (FIG. 3), that is, a lens optical system having the specification as shown in Table 4.

Figure 9:
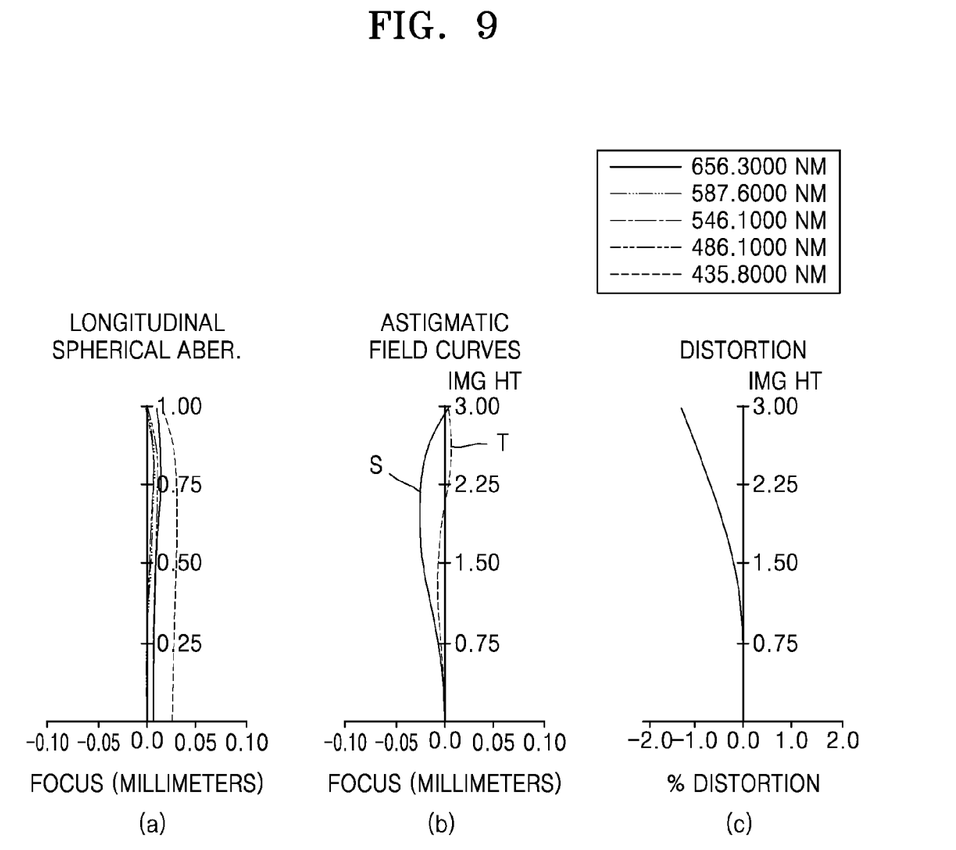
FIG. 9 is an aberration diagram showing longitudinal spherical aberration, astigmatic field curvature, and distortion of a lens optical system according to the fourth embodiment of the present invention; and, FIG. 10 is an aberration diagram showing longitudinal spherical aberration, astigmatic field curvature, and distortion of a lens optical system according to the fifth embodiment of the present invention.

FIGS. 9 (a), (b), and (c) show longitudinal spherical aberration, astigmatic field curvature, and distortion of a lens optical system according to the fourth embodiment of the present invention (FIG. 4), that is, a lens optical system having the specification as shown in Table 5.

Figure 10:
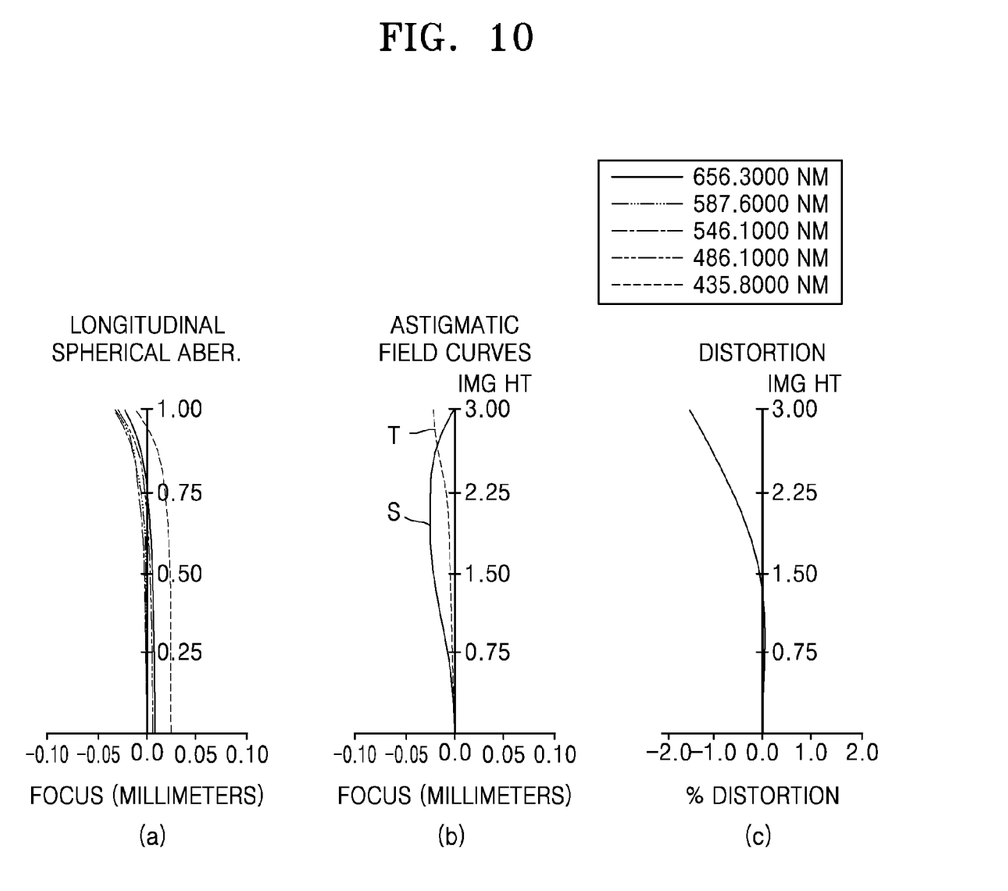

FIGS. 10 (a), (b), and (c) show longitudinal spherical aberration, astigmatic field curvature, and distortion of a lens optical system according to the fifth embodiment of the present invention (FIG. 5), that is, a lens optical system having the specification as shown in Table 6.

As described above, each of the lens optical systems according to embodiments of the present invention may include the sequentially arranged first through sixth lenses I through VI respectively having a negative (−) power, a positive (+) power, a positive (+) power, a positive (+) power, a negative (−) power, and a positive (+) power and may satisfy at least one of Inequality 1 and Inequality 2 defined above. Such a lens optical system may favorably correct various aberrations and may have a relatively short length. Therefore, according to embodiments of the present invention, a small, high-performance lens optical system capable of obtaining high resolution images may be embodied.

Particularly, according to embodiments of the present invention, it is clear from the data regarding the $11^{th}$ surface of the fourth lens IV in FIGS. 2 through 6 that, since the fourth lens IV and the fifth lens V are apart from each other or are arranged as a attached lens by attaching the fourth lens IV and the fifth lens V to each other, the size of a lens optical system may be easily reduced. As described above, the fourth lens IV has a positive (+) power, the fifth lens V has a negative (−) power, and a sum of the powers of the two lenses, i.e., the fourth and fifth lenses IV and V, is a negative (−) power. In other words, a attached lens consisting of the fourth lens IV having a positive (+) power and the fifth lens V having a negative (−) power has a negative (−) power.

By forming the first through sixth lenses I through VI using a plastic material and forming at least one of the incidence surface and the emission surface of at least the sixth lens VI from among the lenses as an aspherical surface, a compact and high-performance lens optical system may be embodied with a lower cost than when a glass lens is used.

Furthermore, according to another embodiment of the present invention, if at least one of the incidence surface 14* and the emission surface 15* is an aspherical surface having at least one inflection point in a direction from the center to a periphery thereof, various aberrations may be easily corrected and thus an angle of emission of the chief ray is reduced, thereby preventing vignetting on a corner in a diagonal direction.

As described above, according to the one or more of the above embodiments of the present invention, a small, high-performance lens optical system capable of obtaining high resolution images may be embodied. In detail, each of the lens optical systems according to embodiments of the present invention may include the sequentially arranged first through sixth lenses I through VI respectively having a negative (−) power, a positive (+) power, a positive (+) power, a positive (+) power, a negative (−) power, and a positive (+) power and may satisfy at least one of Inequality 1 and Inequality 2 defined above. Such a lens optical system may easily and favorably correct various aberrations and may have a relatively short length, thus being advantageous for improving the performance and reducing the size of a lens optical system.

Furthermore, by forming the first through sixth lenses I through VI using a plastic material, a compact and high-performance lens optical system may be embodied with a lower cost than when a glass lens is used.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A lens optical system comprising a lens optics including a first lens, a second lens, a third lens, a fourth lens, a fifth lens, and a sixth lens, each of which includes an incidence surface facing an object and an emission surface facing an image plane, arranged on the optical axis between the object and the image plane, wherein the first lens is a meniscus-type lens having a negative (−) power and convex toward the object, the second lens is a meniscus lens having a positive (+) power and concave away from the object, the third lens is a double-convex lens having a positive (+) power, the fourth lens is a lens having a positive (+) power and having the emission surface that is convex toward the image plane, the fifth lens is a lens having a negative (−) power and having the incident surface concave away from the image plane, the sixth lens is a lens having a positive (+) power, has at least one aspherical surface, and is convex toward the image plane, and a stop arranged between the second lens and the third lens, wherein the following Inequality is established between the total viewing angle θ of the lens optical system and the Y semi-aperture YA1 of the emission surface of the first lens $0.7 < \tan(\theta) YA1 < 1.4.$  <Inequality>

2. The lens optical system of claim 1, wherein a refraction index Nd6 of the sixth lens satisfies the following Inequality $1.5 < Nd6 < 1.65.$  <Inequality>

3. The lens optical system of claim 1, wherein the fourth lens is a double convex-lens.

4. The lens optical system of claim 1, wherein the fourth lens and the fifth lens are attached to each other and constitute an attached lens, and the attached lens has a negative (−) power.

5. The lens optical system of claim 4, wherein the fourth lens is a double convex-lens.

* * * * *